(12) United States Patent
Basilico (10) Patent No.: US 7,969,822 B2
(45) Date of Patent: *Jun. 28, 2011

(54) SYSTEM AND METHOD FOR EXTENDING GPS TO DIVERS AND UNDERWATER VEHICLES

(75) Inventor: Albert R. Basilico, Raleigh, NC (US)

(73) Assignee: Estate of Albert R. Basilico, Raleigh, NC (US)

(*) Notice: Subject to any disclaimer, the term of this patent is extended or adjusted under 35 U.S.C. 154(b) by 201 days.

This patent is subject to a terminal disclaimer.

(21) Appl. No.: 12/359,567

(22) Filed: Jan. 26, 2009

(65) Prior Publication Data

US 2009/0141591 A1  Jun. 4, 2009

Related U.S. Application Data

(63) Continuation-in-part of application No. 11/856,449, filed on Sep. 17, 2007, now Pat. No. 7,483,337, which is a continuation-in-part of application No. 11/182,894, filed on Jul. 15, 2005, now Pat. No. 7,272,074.

(51) Int. Cl.
*G01S 3/80* (2006.01)
*G01C 21/00* (2006.01)

(52) U.S. Cl. ........................ 367/131; 367/128

(58) Field of Classification Search .............. 367/128, 367/131, 134; 701/213; 342/357.06, 357.14
See application file for complete search history.

(56) References Cited

U.S. PATENT DOCUMENTS

| | | | |
|---|---|---|---|
| 3,853,081 A * | 12/1974 | Daudelin et al. | 114/20.2 |
| 3,944,967 A * | 3/1976 | Acks et al. | 367/117 |
| 3,986,161 A * | 10/1976 | MacKellar | 367/118 |
| 4,103,279 A * | 7/1978 | Dildy et al. | 367/87 |
| 4,128,839 A * | 12/1978 | McComas | 342/32 |
| 4,315,263 A * | 2/1982 | Neidell | 342/451 |
| 4,532,617 A * | 7/1985 | Baecker et al. | 367/19 |
| 4,558,439 A * | 12/1985 | Gudesen | 367/127 |
| 4,604,733 A * | 8/1986 | Brown et al. | 367/2 |
| 4,622,557 A * | 11/1986 | Westerfield | 342/357.48 |
| 5,038,406 A * | 8/1991 | Titterton et al. | 342/45 |
| 5,077,703 A * | 12/1991 | Strauss | 367/118 |
| 5,079,753 A * | 1/1992 | Suggs | 367/131 |
| 5,119,341 A * | 6/1992 | Youngberg | 367/5 |
| 5,148,412 A * | 9/1992 | Suggs | 367/131 |
| 5,185,725 A * | 2/1993 | Kent et al. | 367/129 |
| 5,187,871 A * | 2/1993 | McDermott | 33/354 |
| 5,303,206 A * | 4/1994 | Bemb et al. | 367/127 |
| 5,331,602 A * | 7/1994 | McLaren | 367/134 |
| 5,369,623 A * | 11/1994 | Zerangue | 367/93 |
| 5,570,323 A * | 10/1996 | Prichard et al. | 367/131 |
| 5,579,285 A * | 11/1996 | Hubert | 367/133 |

(Continued)

*Primary Examiner* — Dan Pihulic (74) *Attorney, Agent, or Firm* — Coats & Bennett, P.L.L.C.

(57) ABSTRACT

A navigation system extends satellite navigation to divers, underwater vehicles, and surface vessels. The navigation system comprises a location reference unit and a plurality of sub-surface beacon units. The location reference unit includes a receiver to receive navigation signals from earth-orbiting satellites and/or an inertial navigation system. The location reference unit further includes control circuits to communicate with to sub-surface beacon units and to transmit location information to said sub-surface beacon units, and a transceiver to transmit location information to the sub-surface beacon units. The beacon units include control circuits to determine the location of the beacon unit based on location information received from the location reference unit, and a transceiver to receive location information from the location reference unit and to transmit location information to a guided unit to provide navigation assistance to the guided unit.

24 Claims, 4 Drawing Sheets

U.S. PATENT DOCUMENTS

| | | | | |
|---|---|---|---|---|
| 5,659,520 | A * | 8/1997 | Watson et al. | 367/127 |
| 5,668,775 | A * | 9/1997 | Hatteland | 367/130 |
| 5,708,626 | A * | 1/1998 | Hrubes | 367/131 |
| 5,761,153 | A * | 6/1998 | Gikas et al. | 367/99 |
| 5,784,339 | A * | 7/1998 | Woodsum et al. | 367/134 |
| 5,899,204 | A * | 5/1999 | Cochran | 128/205.23 |
| 5,956,291 | A * | 9/1999 | Nehemiah et al. | 367/131 |
| 6,016,119 | A * | 1/2000 | Krasner | 701/213 |
| 6,064,942 | A * | 5/2000 | Johnson et al. | 701/213 |
| 6,163,503 | A * | 12/2000 | Gudbjornsson | 367/6 |
| 6,281,970 | B1 * | 8/2001 | Williams et al. | 701/214 |
| 6,327,220 | B1 * | 12/2001 | Miller et al. | 367/134 |
| 6,377,515 | B1 * | 4/2002 | Healey | 367/88 |
| 6,396,432 | B1 * | 5/2002 | Riemschneider et al. | 342/357.29 |
| 6,512,478 | B1 * | 1/2003 | Chien | 342/357.25 |
| 6,625,083 | B2 * | 9/2003 | Vandenbroucke | 367/15 |
| 6,662,742 | B2 * | 12/2003 | Shelton et al. | 114/312 |
| 6,665,631 | B2 * | 12/2003 | Steinbrecher | 702/159 |
| 6,690,618 | B2 * | 2/2004 | Tomasi et al. | 367/127 |
| 6,701,252 | B2 | 3/2004 | Brown | |
| 6,750,845 | B2 * | 6/2004 | Hopper | 345/156 |
| 6,771,563 | B1 * | 8/2004 | Bernard | 367/131 |
| 6,791,490 | B2 * | 9/2004 | King | 342/357.57 |
| 6,807,127 | B2 * | 10/2004 | McGeever, Jr. | 367/131 |
| 6,816,437 | B1 * | 11/2004 | Teller et al. | 367/129 |
| 7,023,331 | B2 * | 4/2006 | Kodama | 702/106 |
| 7,034,911 | B2 * | 4/2006 | Kato | 349/113 |
| 7,072,244 | B2 * | 7/2006 | Rogers | 367/88 |
| 7,145,835 | B2 * | 12/2006 | Pope | 367/131 |
| 7,272,074 | B2 * | 9/2007 | Basilico | 367/128 |
| 7,333,394 | B2 * | 2/2008 | Basilico | 367/131 |
| 7,362,653 | B2 * | 4/2008 | Green et al. | 367/131 |
| 7,483,337 | B2 * | 1/2009 | Basilico | 367/128 |
| 2002/0097184 | A1 * | 7/2002 | Mayersak | 342/357.05 |
| 2002/0140599 | A1 * | 10/2002 | King | 342/357.14 |
| 2003/0117893 | A1 * | 6/2003 | Bary | 367/16 |
| 2003/0135326 | A1 * | 7/2003 | Brown | 701/213 |
| 2003/0222820 | A1 * | 12/2003 | Karr et al. | 342/457 |
| 2004/0068371 | A1 * | 4/2004 | Estep | 701/213 |
| 2004/0155815 | A1 * | 8/2004 | Muncaster et al. | 342/357.09 |
| 2004/0196180 | A1 * | 10/2004 | Hollis et al. | 367/134 |
| 2004/0220722 | A1 * | 11/2004 | Taylor | 701/200 |
| 2004/0230373 | A1 * | 11/2004 | Tzamaloukas | 701/208 |
| 2004/0230374 | A1 * | 11/2004 | Tzamaloukas | 701/217 |
| 2004/0233784 | A1 * | 11/2004 | Bernard | 367/99 |
| 2006/0196499 | A1 * | 9/2006 | Cannizzaro | 128/200.14 |
| 2006/0215494 | A1 * | 9/2006 | Thomas | 367/128 |
| 2006/0239122 | A1 * | 10/2006 | Vigen et al. | 367/131 |
| 2006/0293806 | A1 * | 12/2006 | Basilico | 701/21 |
| 2007/0006472 | A1 * | 1/2007 | Bauch | 33/355 R |
| 2007/0014189 | A1 * | 1/2007 | Basilico | 367/128 |
| 2008/0008045 | A1 * | 1/2008 | Basilico | 367/128 |
| 2008/0046139 | A1 * | 2/2008 | Basilico | 701/21 |
| 2009/0141591 | A1 * | 6/2009 | Basilico | 367/128 |

* cited by examiner

SYSTEM AND METHOD FOR EXTENDING GPS TO DIVERS AND UNDERWATER VEHICLES

RELATED APPLICATION

This application is a continuation-in-part and claims the benefit of U.S. patent application Ser. No. 11/856,449, now U.S. Pat. No. 7,483,337, filed Sep. 17, 2007 titled "System And Method For Extending GPS To Divers And Underwater Vehicles," which is a continuation-in-part of U.S. patent application Ser. No. 11/182,894 filed Jul. 15, 2005 titled "System And Method For Extending GPS To Divers And Underwater Vehicles," now U.S. Pat. No. 7,272,074. Both of these applications are incorporated herein by reference in their entireties.

BACKGROUND OF THE INVENTION

The present invention relates generally to underwater navigation and, more particularly, to a method and apparatus for extending GPS navigation to divers and underwater vehicles.

Satellite-based positioning systems, such as the Global Positioning System (GPS), provide the ability to accurately determine location virtually almost anywhere on or above the Earth's surface. The GPS system comprises 24 earth-orbiting satellites located in 6 orbital planes. Each earth-orbiting satellite carries an atomic clock and continuously broadcasts radio signals indicating its current time and location. A receiver located on the Earth's surface can receive these radio signals and determine its distance from the satellites based on the time of arrival of the signals. By receiving signals from four satellites, an Earth-based receiver can determine its location by triangulation.

GPS signals do not propagate underwater. Consequently, divers and underwater vehicles beneath the water's surface are not able utilize these GPS signals to navigate accurately. A number of systems have been proposed for extending GPS to underwater divers and vehicles. For example, U.S. Pat. Nos. 6,701,252 to Brown and 6,657,585 to Kucik disclose a floating buoy that is connected by a tether to a diver or underwater vehicle. The floating buoy carries a GPS antennas and/or receiver and conveys signals via the tether to the diver or underwater vehicle. This solution is limited in utility by the need for a tether connecting the underwater diver or vehicle to the floating buoy. U.S. Pat. No. 5,119,341 to Youngberg discloses a system for extending GPS to divers and vehicles beneath the water's surface using buoys that float freely on the surface. The floating buoys can receive signals from GPS satellites and can communicate underwater users using acoustic signals. However, the floating buoys do not stay in place, but instead drift on the surface of the water. Further, floating buoys are subject to easy detection and thus are not suitable for covert operations.

SUMMARY OF THE INVENTION

The present invention provides an underwater navigation system that effectively extends GPS to underwater users and devices. The present invention could also be used to provide navigation signals to surface moving vessels. The underwater navigation system comprises a plurality of sub-surface beacon units that are designed to sink to the ocean bottom and at least one location reference unit that is designed to initialize the beacon units with their location. The beacon units and the location reference unit are positioned in an area where navigation assistance is needed. The beacon units sink immediately to the ocean bottom. In some embodiments, the location reference unit determines its location and transmits its location to the sub-surface beacon units. The beacon units may then calculate their respective location based on the reported locations of and distance from one or more location reference units. In other embodiments, the location reference unit sequentially calculates the position offset of each beacon unit within range, combines the calculated offset with the location reference unit's latitude, longitude and rotational orientation (e.g. relative to magnetic north) and transmits the fully calculated beacon unit position to each beacon respectively. With their location established, the beacon units may then provide navigation assistance to divers, underwater craft, or surface vessels without the aid of the location reference unit.

DETAILED DESCRIPTION OF THE INVENTION

Figure 1:
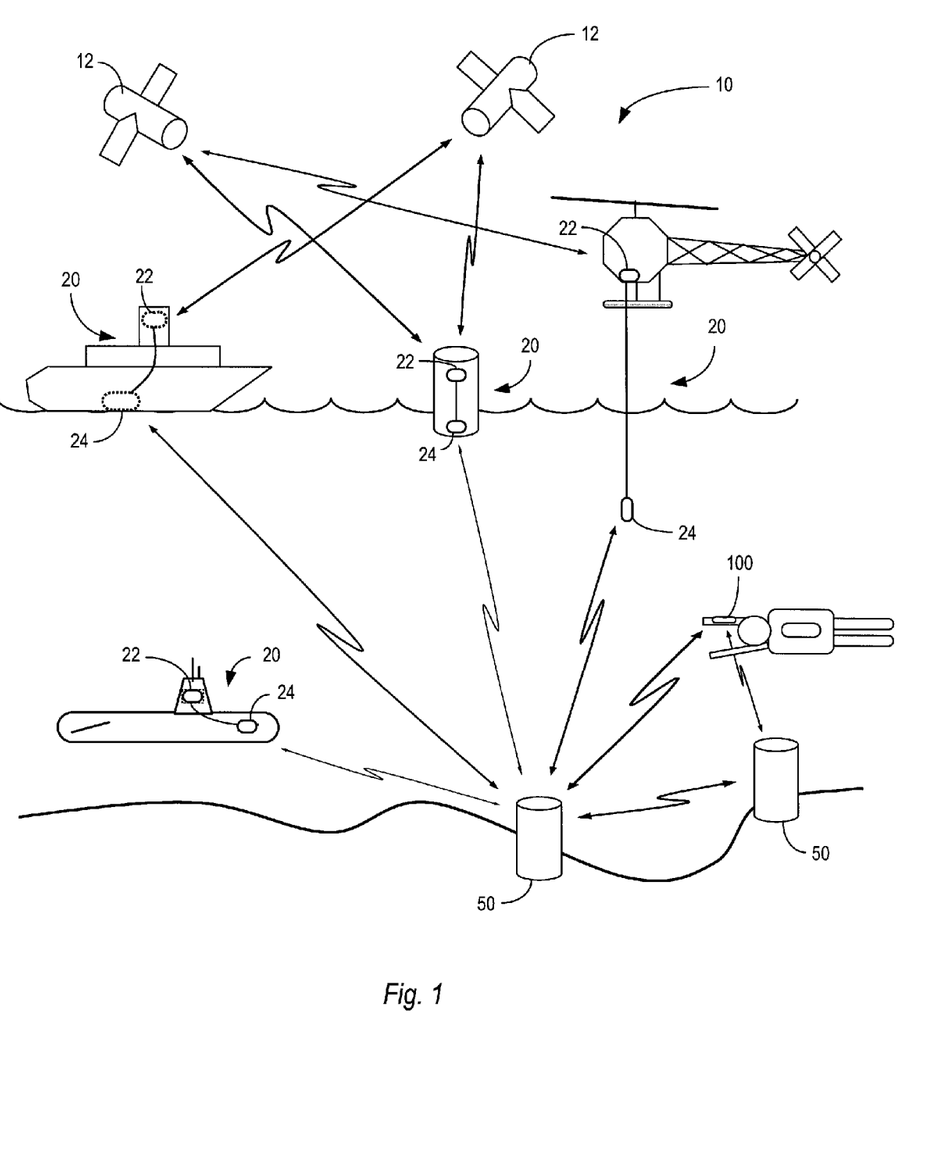
FIG. 1 illustrates an exemplary embodiment of the underwater navigation system according to the present invention that utilizes navigational signals received from earth orbiting satellites.

FIG. 1 illustrates an underwater navigation system indicated generally by the numeral 10 according to one exemplary embodiment. The underwater navigation system 10 provides navigation assistance to a diver, underwater vessel, or surface vessel, which are referred to herein generically as guided units 100. The underwater navigation system 10 comprises two main components: one or more location reference units 20 and a plurality of beacon units 50. The location reference unit 20 provides a reference location for the beacon units 50 while the beacon units 50 are being deployed and initialized. When deployed, the beacon units 50 sink below the surface and anchor to the floor. Once the beacon units 50 are anchored, the beacon units 50 determine their respective locations based on the distance of the beacon unit 50 from one more location reference units 20. After being initialized, the beacon units 50 provide navigation assistance to the guided units 30.

Figure 2:
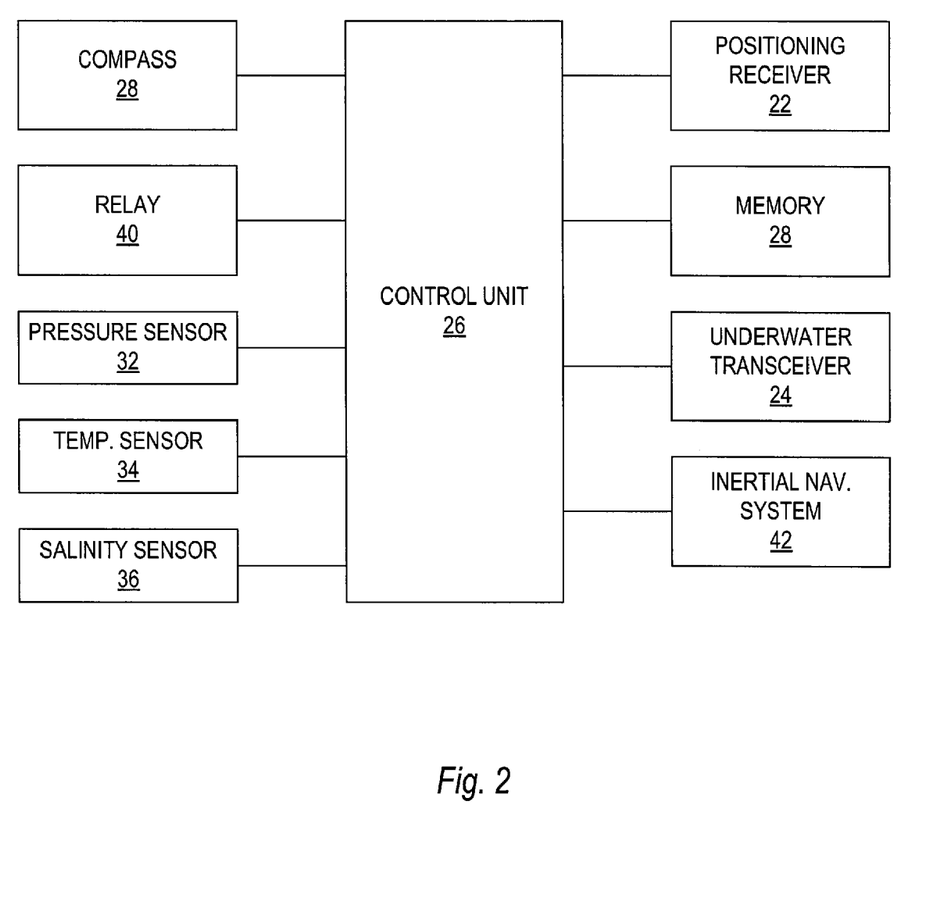
FIG. 2 illustrates an exemplary location reference unit for the underwater navigation system that utilizes navigational signals received from earth orbiting satellites.

FIG. 2 illustrates the main components of the location reference unit 20. The location reference unit 20 comprises a positioning receiver 22 for communicating with conventional spaced-based or land-based navigation systems, an underwater transceiver 24 for communicating with beacon units 50, control unit 26, and memory 28. The positioning receiver 26 may, for example, comprise a Global Positioning System (GPS) receiver for receiving navigation signals from GPS satellites. As known in the art, the location of the location reference unit 20 may be determined based on the received GPS signals. The underwater transceiver 24 comprises any type of transceiver that is capable of communicating with underwater beacon units 50. The underwater transceiver 24 may, for example, communicate with beacon units 50 using acoustic signals, radio signal, light signals, or vibration. The control unit 26, which may comprise one or more processors, microcontrollers, hardware, or a combination thereof, controls overall operation of the location reference unit 20, processes position signals received by the GPS receiver 26, and generates information and control signals to be transmitted to the beacon units 50 via underwater transceiver 24. Control unit 26 also processes information and control signals received from the beacon units 50. Memory 28 stores program instructions and data needed for operation. The location reference unit 20 is powered by an on-board battery (not shown).

The location reference unit 20 may also optionally include a magnetic field detector or compass 30 to determine the rotational orientation of the location reference unit 20. As described in more detail below, the rotational orientation of the location reference unit 20 may be used to calculate the location of a beacon unit 50. In some embodiments where the location reference unit 20 also functions as a beacon unit 50, the location reference unit 20 may include a pressure sensor 32 to determine its depth below the surface of the water. The location reference unit 20 may also include a temperature sensor 43 to determine water temperature and a salinity sensor 36 to determine the salinity of the water. In some embodiments, the location reference unit 20 may further include a relay 40 activated by the control circuits 26 to sink or destroy the location reference unit 20 after the beacon units 50 have determined their locations.

In some embodiments, the location reference unit 20 may be mounted on a surface buoy that floats on the surface of the water. The surface buoy and beacon units 50 are both dropped into the ocean, such as by aircraft. The beacon units 50 sink to the ocean bottom while the surface buoy floats on the surface long enough for the beacon units 50 to determine their locations. Once the beacon units 50 have determined their locations, the surface buoy may sink or self-destruct.

In other embodiments, the location reference unit 20 may be transported by a surface vessel or aircraft. In such instances, the surface vessel or aircraft may simply travel into the area where underwater navigation assistance is needed, drop the beacon units 50, initialize the beacon units 50, and leave the area after the beacon units 50 are initialized. If the location reference unit 20 is mounted to an aircraft, the underwater transceiver 24 may be suspended from the aircraft by a cable and dipped into the water to communicate with beacon units 50. In some embodiments, a location reference unit 20 mounted in an aircraft or earth-orbiting satellite may use a high-power light beam to communicate with beacon units 50 that are located underwater. In embodiments comprising a light beam for communication, the light energy reaching the receiver may be maximized by dynamically correcting optical path impairments using adaptive optics and/or non-linear optics.

In some embodiments, the location reference unit 20 may be transported by an underwater vehicle, such as a submarine. In this case, the location reference unit 20 may optionally include an inertial navigation system 42. The location reference unit 20 may determine a starting location by receiving navigational signals at an area other than where underwater navigation assistance is needed. Also, the starting location may be the known coordinates of a port of call. The transporting vehicle may thereafter submerge and travel to the area where underwater navigation assistance is needed. While traveling beneath the surface, the inertial navigation system 42 tracks the location of the location reference unit 20. Upon reaching the area where underwater navigation assistance is needed, the location reference unit 20 transmits location information determined by the inertial navigation system 40 to the beacon units 50. Because the inertial navigation system 40 determines the location of the location reference unit 20 without relying on navigational signals received at the area where underwater navigation assistance is needed, surface exposure in this area is eliminated.

Figure 3:
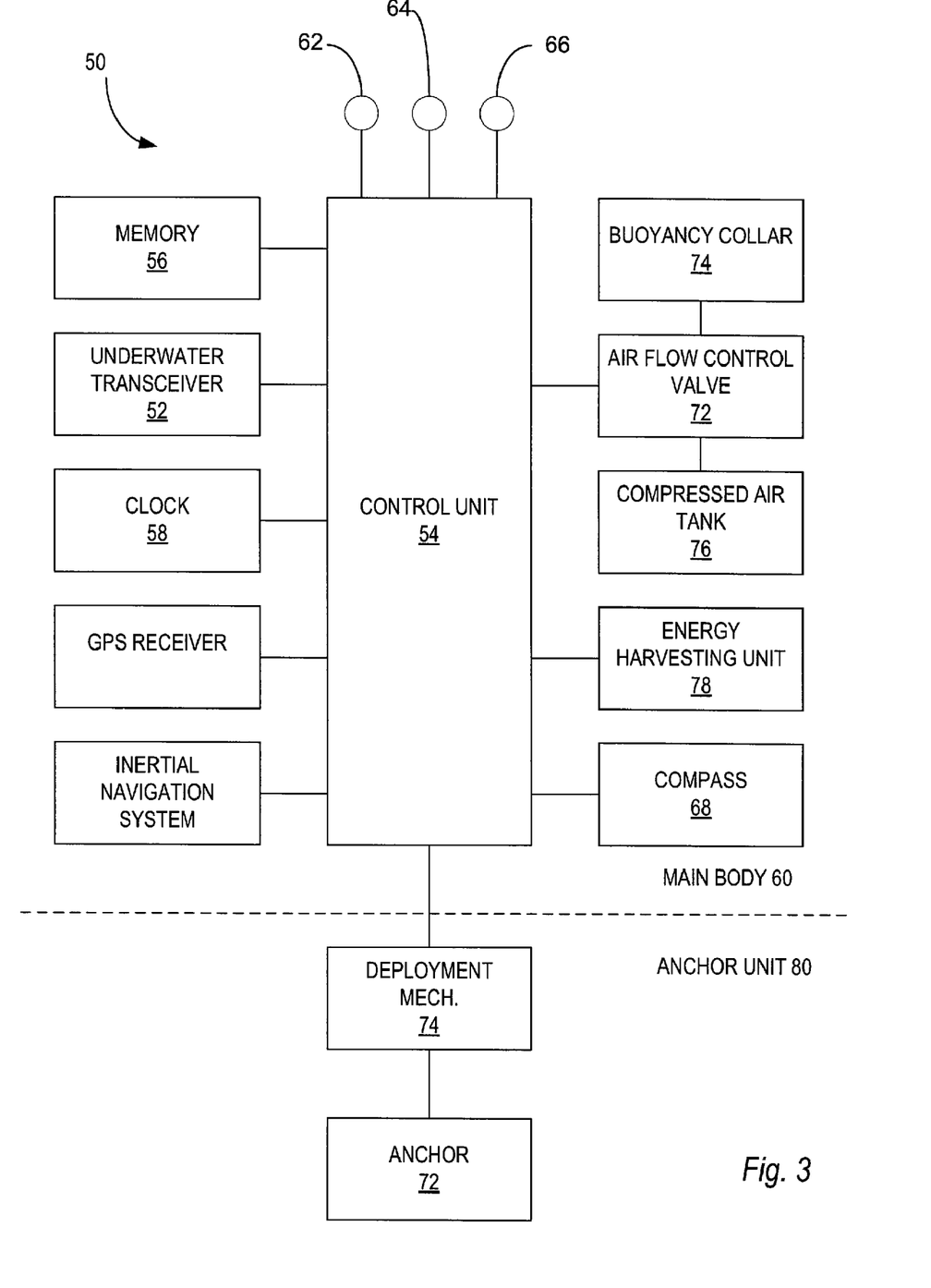
FIG. 3 illustrates an exemplary beacon unit for the underwater navigation system.

FIG. 3 illustrates the main components of an exemplary beacon unit 50. Beacon unit 50 comprises an underwater transceiver 52, control circuits 54, memory 56, and a clock 58, which are contained in a main body 60. The underwater transceiver 52 comprises any type of transceiver that is capable of communicating with the location reference unit 20, other beacon units 50, and/or guided units 100 while the beacon unit 50 is submerged underwater. The underwater transceiver 52 may, for example, communicate with remote devices using acoustic signals, radio signal, light signals, or vibration. Control circuits 54 control the overall operation of the beacon unit 50, and process information and control signals received from the location reference unit 20, other beacon units 50, and/or guided units 100. Memory 56 stores program instructions and data needed for operation. Clock 58, which may comprise an atomic clock, provides an accurate time reference for synchronization as hereinafter described. Power for the beacon unit 50 is supplied by a battery (not shown).

In one embodiment, the underwater transceiver 52 comprises a laser transceiver that operates at wavelengths in the range of 520 nm to 570 nm. Water absorbs very little energy in the blue-green portion of the spectrum and highly collimated laser beams suffer extremely low spreading loss. In general, the effective range of the laser transceiver will be limited by dispersion of the laser light by particulate matter in the water. In some embodiments, a scanning mechanism can be used to direct the laser beam in a spherical or cylindrical pattern for uni-directional communications from a beacon unit 50 to a submerged guided unit 100. The submerged guided unit 100 may receive the communication passively, that is, without the guided unit 100 transmitting any signals at all.

The beacon unit 50 may also include a pressure sensor 62, temperature sensor 64, and/or salinity sensor 66. The pressure sensor 62 is used to determine the depth of the beacon unit 50, which may be used in some position calculations. Similarly, the temperature sensor 64 and salinity sensor 66 determine respectively, the temperature and salinity of the water. The rate at which acoustic signals propagate in water depend on the depth, temperature and salinity of the water. Therefore, knowledge of these parameters helps improve the accuracy of distance calculations. In some embodiments, the beacon unit 50 may further include a magnetic field sensor or compass 68 to determine the rotational orientation of the beacon unit 50.

In some embodiments, the main body 60 further comprises energy harvesting unit 78 that generates, stores and converts electricity to re-charge a battery (not shown). The energy harvesting unit 78 can generate electricity from ambient energy, including by way of example, ambient light, thermal gradients, salinity gradients, mechanical motion (kinetic energy) induced by tides, waves or currents and acoustic energy.

Figure 4:
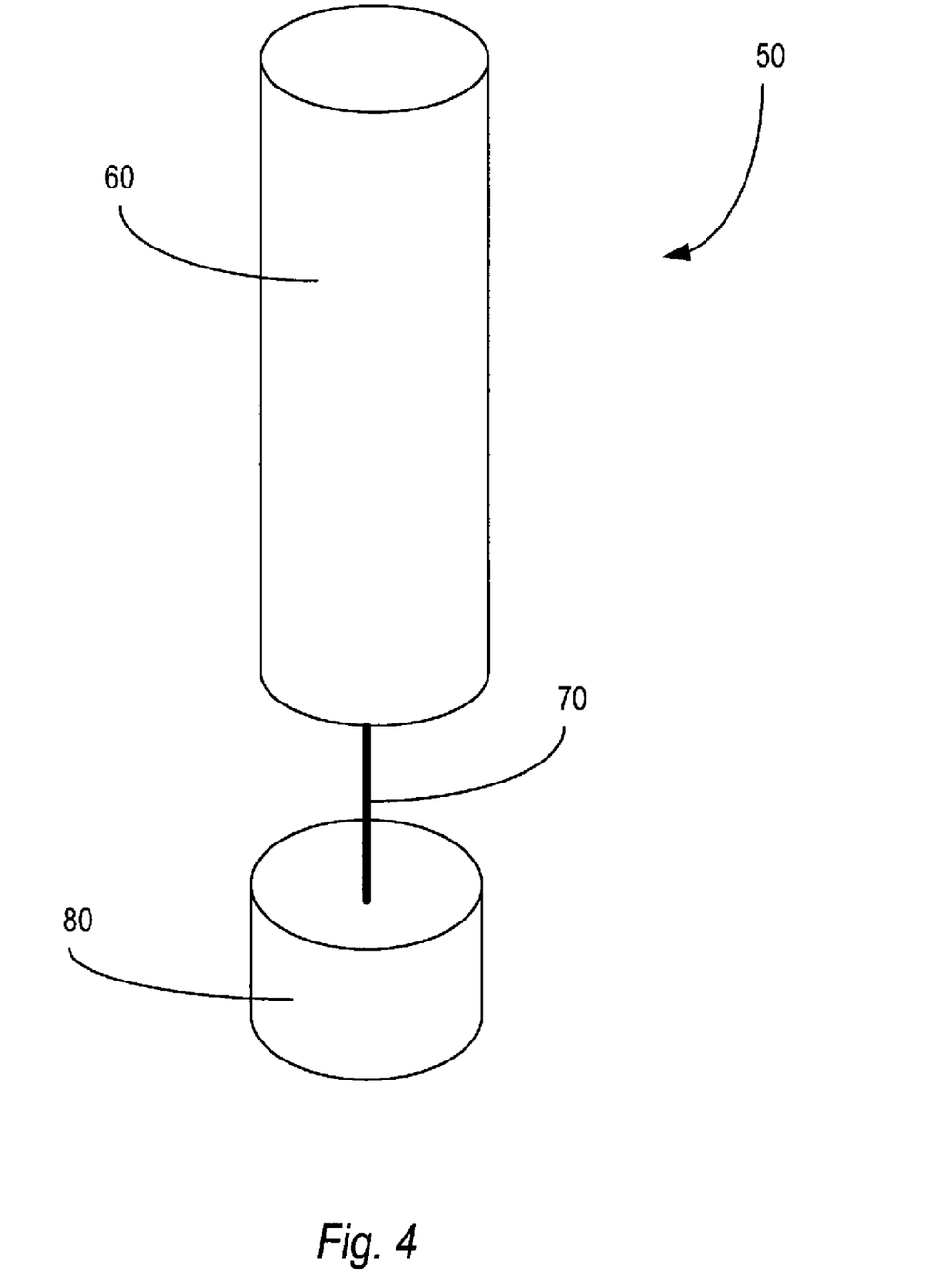
FIG. 4 illustrates a two-part beacon unit for the underwater navigation system.

An anchor unit 80 is provided for anchoring the beacon unit 50 to the ocean floor or sea floor. The anchor unit 80 may be separable from a main body 60 which contains the other elements as shown in FIG. 4. The anchor unit 70 comprises an anchoring device 82 and a deployment unit 84 for deploying the anchoring device 82. When deployed on a sandy, muddy or grassy bottom the anchoring device 82 may comprise a cylindrically shaped weight, of sufficient mass to hold the anchoring device 70 without dragging or drifting, even in the presence of wave, tides and currents. When deployed on a rock or other hard surfaced sea floor the anchoring device 72 may include a hardened metal spike that is driven into the sea floor by the impulse force generated by detonating a 22-caliber cartridge, or by repeated impulses generated using compressed air from a compressed air tank.

The main body 60 may be provided with a buoyancy collar 74 that is connected to a compressed air tank 76. The control unit 54 can actuate an air flow control valve 72 to fill the buoyancy collar 74 once the beacon unit 50 is anchored in place. Inflation of the buoyancy collar 74 causes the main body 60 to become positively buoyant. The control circuit 54 then initiates separation of the main body 60 from the anchoring device 70. The main body 60 remains tethered to the anchor unit 80 by a tether 70, such as a cable; rope, chain or rigid rod. Referring to FIG. 4, the anchor unit 80 and tether 70 allow the main body 60 to float in a near-vertical orientation even if the sea floor is sloped or un-even. The control unit 54 then calculates the location of the beacon unit 50 on the sea floor using signals received and/or exchanged with location reference units 20 and/or other beacon units 50.

To use the underwater navigation system, the location reference units 20 and beacon units 50 are deployed in an area where navigation assistance is needed. The location reference units 20 can be mounted to buoys that float on the surface of the water. Alternatively, the location reference units 20 can be transported by surface vessels, underwater vehicles, spacecraft or aircraft. The location reference units 20 determine their location based on GPS signals received from GPS satellites 12. After the location reference unit 20 fixes its location, the location reference unit 20 transmits its location to each of the beacon units 50. The beacon units 50 can then determine their respective locations by determining the distance from one or more location reference units 20 as described in more detail below.

Once the locations of the beacon units 50 are determined, the location reference unit 20 may be removed from the surface of the water to avoid detection. Removal of the location reference unit 20 may be accomplished in a number of ways. If the location reference unit 20 is mounted on a buoy, the location reference unit 20 may be picked up by a vessel passing through the area. Similarly, if the location reference unit 20 is mounted to a surface vessel, underwater vessel, or aircraft, the vessel or aircraft may simply leave the area. In some embodiments, a surface-floating buoy with a location reference unit 20 can self-destruct or sink to the floor. In the latter case, the location reference unit 20 may serve as an additional beacon unit 50 once it anchors itself to the floor. The location reference unit 20, which is now serving as a beacon unit 50, may determine its location from subsequently-deployed location reference units 20, or from already-deployed beacon units 50 with known locations.

Two main approaches can be used to determine the location of the beacon units 50. In the first approach, referred to herein as the triangulation approach, the distance of the beacon unit 50 from at least three location reference units 20 and/or other beacon units 50 is determined; only two location reference units are needed if the location reference units move and multiple triangulation measurements are performed. Each location reference unit 20 determines its location based on receipt of navigation signals and transmits its location to the beacon unit 50. The distance of the beacon unit 50 from each location reference unit 20 is also determined. The distance may be determined by the location reference units 20 and transmitted to the beacon units 50, or may be determined by the beacon units 50 themselves. Based on the distance of the beacon unit 50 from the location reference units 20 and the location of the location reference units 20, the beacon unit 50 can determine its location accurately by triangulation. Because the beacon units 50 may be assumed to be below the surface of the water, and hence below the location reference units 20, the beacon units 50 can accurately determine their location based on its distance from three location reference units 20 and its depth. The depth of the beacon unit 50 may be determined based on a pressure sensor. Alternatively, one or more of the location reference units 20 could calculate the position of the beacon unit 50 based on distance measurements and transmit the location to the beacon unit 50.

In the second approach, referred to herein as the vector approach, the location of a beacon unit 50 is determined using a single location reference unit 20. In this approach, the location reference unit 20 determines its location based on receipt of GPS signals and transmits its location to the beacon unit 50. The beacon unit 50 includes a magnetic field sensor or a compass to determine the rotational orientation of the beacon units 50 and a pressure sensor or other device to determine the depth of the beacon unit 50. The beacon unit 50 determines the direction and distance to the location reference unit 20. With knowledge of the location reference unit's location and the vector extending between the location reference unit 20 and the beacon unit 50, the beacon unit 50 can accurately determine its location. Alternatively, the beacon unit 50 can transmit its depth to location reference unit 20 and location reference unit 20 could include a magnetic field sensor or a compass and compute the location of the beacon unit 50 and transmit the computed location to the beacon unit 50.

In some embodiments of the invention, the beacon units 50 may optionally be equipped with a GPS receiver and inertial navigation system. In this embodiment, the beacon units 50 may temporarily float on the surface of the water and determine their starting position on the water surface based on GPS signals received. Once the beacon units 50 determine their location, the beacon units 50 may then sink to the floor of the ocean. While sinking to the floor, hydro-dynamic forces may act on the beacon units 50 and may carry the beacon units 50 a substantial distance. The inertial navigation system may track the movement of the beacon unit 50 as its sinks to the ocean floor. After anchoring itself to the ocean floor, the beacon units 50 can determine their respective locations based on the starting location determined on the water surface and the data from the inertial navigation system. An advantage of this approach is that no separate location reference unit is required.

Various techniques can be used for determining the distance between the location reference unit 20 and beacon unit 50. Three exemplary methods for determining distance are described below. These three methods are referred to herein as the time of arrival method, the time of travel method, and the dual tone method. The accuracy of the time of arrival method, time of travel method and the dual tone method may by improved by measuring the depth, water temperature and salinity at the beacon unit 50 and the location reference unit 20 and extrapolating the measured depth, temperature and salinity between the units. Those skilled in the art will appreciate that the present invention is not limited to the methods enumerated herein and that other methods may be used for determining distance.

The time of arrival method requires clock synchronization between the location reference unit 20 and beacon unit 50. In this method, the beacon unit 50 sends a message to the location reference unit 20 requesting the location reference unit 20 to transmit a response message at a time known to the beacon unit 50. The request or response message may specify the transmit time, or the transmit time may be specified by a protocol. For example, the protocol may specify that the location reference unit 20 transmit a response message only when the m least significant bits of the location reference unit's clock are all 0. Because the clocks are synchronized, the beacon unit 50 can use the time of arrival of the signal to compute the distance to the location reference unit 20. Using the m least significant bits as a time of transmission reference is advantageous; however, it results in aliasing of the distance measurement. For example, the m least significant bits will be the same if the message is sent at exactly 2:05 and 2:06 PM. The ambiguity can be resolved by repeating the message and using the time of travel or dual tone methods described below.

The time of travel method does not require clock synchronization. In this method, the beacon unit 50 sends a message to the location reference unit 20. Upon receipt of the message by the location reference unit 20, the location reference unit 20 generates and sends a reply message to the beacon unit 50. The reply message includes a delay value indicating the delay between the time the first message was received at the location reference unit 20 and the time that the reply message was sent. The beacon unit 50 may use the round trip time and the turnaround delay to compute the distance to the location reference unit 20.

The dual tone method uses the fact that acoustic signals transmitted at different frequencies will attenuate at different rates. In this method, the beacon unit 50 sends a message to the location reference unit 20 requesting the location reference unit 20 to send a dual tone signal. In response, the location reference unit 20 transmits a dual tone signal comprising two distinct tones. The distinct tones may be transmitted with equal power. Alternatively, the distinct tones can be transmitted at different power levels if the power levels, or the power ratio, are known. The power in each tone will attenuate as a known function of the distance traveled. With knowledge of the attenuation rate for each tone component, the beacon unit 50 can compute distance to the location reference unit 20 based on the difference in the received power of the tone components.

Those skilled in the art will appreciate that the operations of the beacon unit 50 and location reference unit 20 in the distance calculation could be reversed. That is, the location reference unit 20 could compute the distance to the beacon unit 50 and transmit the distance to the beacon unit 50.

To determine the direction to the location reference unit 20, the underwater transceiver 52 for the beacon unit 50 may comprise a transceiver with an array of acoustic transducers (e.g., sonar transducers). Assuming that the rate of travel of a signal in water is known, the beacon unit 50 can compute the direction to the location reference unit 20 based on the time difference of arrival of a signal transmitted by the location reference unit 20 at each of the acoustic transducers. In a preferred embodiment, three (3) receiver transducers are positioned such that one transducer lies along a line perpendicular to a line drawn between the other two transducers. If the beacon unit 50 does not include a pressure sensor or other method of determining its depth, then four (4) transducers are used, with the fourth transducer placed out of the plane defined by the first three transducers.

During deployment of the beacon units 50, the location reference unit 20 may act as a master unit and controls communication with the beacon units 50. The beacon units 50 sink to the ocean floor and remain silent until activated by the location reference unit 20. The location reference unit 20 may activate the beacon units 50 one at a time by sending an activation code to the beacon unit 50. Alternatively, the beacon units 50 could initiate communication with the location reference unit 20 after reaching the floor of the ocean. After waking, the beacon unit 50 determines its location as previously described by exchanging signals with the location reference unit 20. Once the beacon unit 50 has determined its position, the beacon unit 50 may send a confirmation message to the location reference unit 20. The confirmation message indicates to the location reference unit 20 that the beacon unit 50 has determined its location. The location reference unit 20 can then send a de-activation code to the beacon unit 50 so that the beacon unit 50 returns to a sleep mode. In sleep mode, the transmitter of the beacon unit 50 is turned off, but the beacon unit 50 periodically activates the receiver to monitor for incoming messages. The beacon unit 50 will remain in an inactive mode or sleep mode until it receives an activation code. In some embodiments, the beacon units 50 may be programmed to wake at a predetermined time to avoid the need to transmit an activation code to wake the beacon unit 50.

After a predetermined period of time or after receiving a confirmation message from a predetermined set of beacon units 50, the location reference unit 20 is removed from or leaves the area to avoid detection and thereby permit covert underwater navigation in the area. The means by which the location reference unit 20 is removed may depend on the specific implementation and design of the location reference unit 20. In some embodiments, the location reference unit 20 may sink or destroy itself after the beacon units 50 determine their location. In other embodiments, the location reference unit 20 may comprise a surface vessel, aircraft, or underwater vehicle that can leave the vicinity of the beacon units 50 once the beacon units 50 are deployed and their location determined.

To sink or destroy the surface buoy, the location reference unit 20 may further include a relay 34. The relay 34 is actuated by the control circuits 22 to sink or destroy the surface buoy after a predetermined period of time or after a certain number of the beacon units 50 have established their locations. The control circuits 22 may, for example, generate a control signal that causes the surface buoy to sink or self destruct. In one embodiment, the control signal activates a relay 34 that controls a mechanical system on the surface buoy. For example, activation of the relay 34 may cause floatation devices attached to the surface buoy to detach, thus allowing the surface buoy to sink. In another embodiment, the relay 34 may open a valve, causing a ballast tank to flood with water. The particular mechanism employed to effectuate the sinking or destruction of the surface buoy is not a material aspect of the invention. Any known methods for sinking or destroying the surface buoy can be used. In some embodiments, the location reference unit 20 may switch to a beacon unit mode upon sinking and thereafter function as any other beacon unit 50.

Once the beacon units 50 are deployed, the beacon units 50 can be used by divers or underwater vehicles to navigate covertly without any surface exposure. The diver or underwater vehicle required navigation assistance carries a guided unit 100 that communicates with the previously-deployed beacon units 50. Each beacon unit 50 knows its location and can transmit its location to the guided unit 100. The methods described above for determining the location of the beacon units 50 can also be employed by the guided units 100 to determine their location. In this case, the beacon units 50 provide the location reference for the guided unit 100.

The guided units 100 may use a variation of the time of arrival method to determine distance from a beacon unit 50. The modified time of arrival method allows a guided unit 100 to determine its location without distance aliasing ambiguity while only receiving messages. The initial distance between a guided unit 100 and a beacon unit 50 is determined using the time of travel method or by maneuvering the units into positions where the distance between them has been pre-determined, for example by a physical measurement. By way of example, and referring to FIG. 2, the initial distance between the beacon unit 50 and the guided unit 100 is 1,000 feet. The beacon unit 50 begins sending messages to the guided unit 100 at pre-arranged fixed rate, by example, at a rate of one message per second. The guided unit 100 uses the arrival time of the first received message and the known separation distance to phase-synchronize the clock in the guided unit 100 to the clock in the beacon unit 50. Beginning with the second received message, the guided unit 100 should receive one message per second from the beacon unit 50, at a time coincident with the clock in the guided unit 100 ticking each second. The guided unit 100 compares the actual time of arrive of each message (after the first one) from the beacon unit 50 to the time value reported by the clock within the guided unit 100. Each message should arrive exactly as the clock within the guided unit 100 ticks each second; if not, time adjustment factors are calculated to synchronize the actual message arrival time to the one second clock in the guided unit 100.

The guided units 100 may use a variation of the dual-tone method to determine distance from a beacon unit 50. Two optical beams, each of different wavelength, can be transmitted with known power. The received power of each beam can be measured and the difference in received power can be used to calculate distance based on known attenuation factors associated with each wavelength.

The guided unit 100 may now proceed to an area of the sea where it is to perform its mission. The guided unit 100 calculates its distance from a beacon unit 50 by noting the time of arrival of messages from a beacon unit 50 relative to the adjusted one second timing marks generated by the clock internal to the guided unit 100. By way of non-limiting example, if the speed of sound in water is 5,000 feet per second, and the guided unit 100 receives a message from the beacon unit 50 at 0.2 seconds from the last clock tick as measured by the clock in the guided unit 100, the distance between the beacon unit 50 and the guided unit 100 is computed as the product of the speed of sound in water, 5,000 feet/second, multiplied by the elapsed time, 0.2 second, from the time the message was launched, or 1,000 feet. In a preferred embodiment, location reference unit 20, beacon unit 50 and guided unit 100 each further comprise an atomic clock 100 allowing precise and stable synchronization of the clocks in each unit, and therefore, precise determination of distance over extended periods of time using any of the means and methods discussed herein.

FIG. 4 is a functional block diagram illustrating the main components of the guided unit 100. The main components comprise control circuits 102 for processing data and controlling operation of the guided unit 100, memory 104 for storing code and data used by the control circuits 150, and a communications interface 106. The guided unit 100 may also include a user interface 108. The control circuits 102 may comprise one or more programmable processors, which may be general purpose microprocessors, microcontrollers, digital signal processors, or a combination thereof. Memory 104 represents the entire hierarchy of memory within the guided unit 100 and may comprise discrete memory devices, or may comprise internal memory in one or more microprocessors. The communications interface 106 may comprise a radio interface for use above water, and an underwater transceiver for underwater communications with the beacon units. The radio interface may comprise, for example, a conventional BLUETOOTH, 802.11b, or 802.11g interface. The guided unit 100 may further include a pressure sensor 110 to determine depth below the water's surface, a temperature sensor 112 for determining the water temperature, and a salinity sensor 114 for determining the salinity of the water.

The guided units 100 use a request/response signaling scheme to communicate with beacon units 50. The guided units 100 send a request message to either a beacon unit 50 or another guided unit 100 to initiate a transaction. Response messages are sent in reply to request messages. More than one response message may be sent in reply to a request message. The request message and all corresponding response message constitute a transaction. In the exemplary embodiment, the beacon units 50 do not send request messages, but only send response messages in reply to request messages from the guided units 100. A multiple access schemes, such as frequency division multiple access, time division multiple access, or code division multiple access, may be used to enable communications between the beacon units 50 and multiple guided units 100.

When a guided unit 100 needs to determine its location, the guided unit 100 sends a request message containing an activation code to a beacon unit 50 to initiate communications with the beacon unit 50. The activation code may be encrypted to prevent unauthorized users from activating the beacon unit 50. The beacon unit 50 may also authenticate guided units 100 via a pre-programmed list of guided unit (source) addresses or IDs that are permitted to obtain information from the beacon unit 50. The guided unit 100 may initiate communications with more than one beacon unit 50. After waking, the beacon unit 50 sends a reply message. The guided unit 100 can then send request messages to the beacon unit 50 to obtain navigation assistance. Exemplary uses of request messages include synchronizing clocks with a beacon unit 50 or establishing location.

Once activated, the beacon unit 50 will remain awake until receipt of a deactivation code from the guided unit 100, or until a predetermined period of time has elapsed without any communications. While in an active or wake state, the beacon units 50 will receive and respond to authorized request messages. Various techniques can be used to prevent the beacon unit 50 from responding to unauthorized requests. For example, the beacon unit 50 may require guided units 100 and other units sending requests to provide authentication before responding to the requests. Additionally, the beacon unit 50 may transmit a periodic signal while in the active state to enable guided units 100 to periodically update their location without the need to send an explicit request message to the beacon unit 50. For example, the beacon unit 50 may periodically transmit a periodic message containing a time stamp indicating when the periodic message was transmitted. If the guided unit clock is synchronized with the beacon unit clock, the periodic message can be used by the guided unit 100 to determine distance to the beacon unit 50. The periodic message could also be used to determine direction to the beacon unit 50. If the guided unit clock is not synchronized, the periodic message could be a dual tone signal so that the guided unit 100 can determine distance by the received power of the tone frequencies.

In one exemplary embodiment, a time division multiple access scheme is used to enable a plurality of guided units 100 to communicate with the beacon units 50 using the same frequency. TDMA divides the communication spectrum into sequential time slots that are used to transmit and/or receive data. A device transmits and/or receives only in its assigned time slot(s). The set of non-repeating time slots constitutes a frame. Normally, a frame is a fixed-length. In the present invention, the frame is a variable length frame that accommodates propagation delays between guided units 100 and beacon units 50.

If atomic clocks, or clocks based on atom interferometry, are included in the beacon unit 50 and guided units 100, then clock synchronization is maintained over a usefully long time. In this case, the beacon units 50 can be programmed to periodically transmit its location. Passing divers or submarines can receive the signal and calculate their distance from the beacon unit 50 by the Time of Arrival method. This method allows divers and submarines to maintain stealth.

In some embodiments the beacon unit 50 may include a light source as a "homing" signal to guided units 100 in very close proximity of the beacon unit. By example, a light source may be used to guide an autonomous underwater vehicle (AUV) to the beacon unit 50 where the battery in the AUV may be recharged from the battery in the beacon unit 50 and/or data collected by the AUV may be uploaded to the beacon unit 50 for forwarding to a central data collection location.

In some embodiments using optical signaling, a corner-reflector may be mounted on guided units 100 and/or beacon units 50. Beacon units 50 (location reference units 20) may determine the distance to a guided unit 100 (beacon unit 50) by the time of travel method using light reflected back to the beacon unit 50 (location reference unit 20) from the corner-reflector. The beacon unit 50 (location reference unit 20) then transmits the distance and/or location information to the guided unit 100 (beacon unit 50). Using this method, the guided unit 100 (beacon unit 50) passively receives and does not actively transmit, thus better maintaining stealth.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. An underwater navigation system comprising:
   a location reference unit including:
      a transceiver configured to communicate with one or more sub-surface beacon units and to transmit location information to said sub-surface beacon units; and
      control circuits configured to determine a location of the location reference unit and to transmit location information to one or more beacon units; and
   a plurality of sub-surface beacon units adapted to sink to the sea floor when deployed, each said beacon unit including:
      control circuits configured to determine the location of the beacon unit based on location information received from the location reference unit and/or other beacon unit; and
      a transceiver configured to receive said location information from said location reference unit and/or other beacon unit and to transmit location information to a guided unit to provide navigation assistance to the guided unit.

2. The underwater navigation system of claim 1 wherein the location reference unit transceiver, the beacon unit transceiver and the guided unit transceiver each comprise an acoustic transceiver.

3. The underwater navigation system of claim 1 wherein the location reference unit transceiver, the beacon unit transceiver and the guided unit transceiver each comprise an optical transceiver.

4. The underwater navigation system of claim 1 wherein the location reference unit transceiver, the beacon unit transceiver and the guided unit transceiver each comprise a radio transceiver.

5. The underwater navigation system of claim 1 wherein the location reference unit further includes a positioning receiver to receive navigation signals from a navigation system to determine location of the location reference unit.

6. The underwater navigation system of claim 1 wherein the location reference unit further includes an inertial navigation system for determining the location of the location reference unit relative to a starting location.

7. The underwater navigation system of claim 1 wherein the location reference unit further includes a relay responsive to a control signal from the processing circuits for sinking or destroying said location reference unit.

8. The underwater navigation system of claim 1 wherein said location reference unit further includes a magnetic field sensor or compass for determining rotational orientation.

9. The underwater navigation system of claim 1 wherein said location reference unit further includes a temperature sensor for measuring the temperature of the water where the beacon units are deployed.

10. The underwater navigation system of claim 1 wherein said location reference unit further includes a salinity sensor for measuring the salinity of the water where the beacon units are deployed.

11. The underwater navigation system of claim 1 wherein at least one beacon unit further include an inertial navigation system for determining the location of the beacon unit relative to a starting location.

12. The underwater navigation system of claim 1 wherein at least one beacon unit further includes a magnetic field sensor or compass for determining rotational orientation of the beacon unit.

13. The underwater navigation system of claim 1 wherein at least one beacon unit further includes a temperature sensor for measuring the temperature of the water where the beacon units are deployed.

14. The underwater navigation system of claim 1 wherein at least one beacon unit further includes a salinity sensor for measuring the salinity of the water where the beacon unit is deployed.

15. The underwater navigation system of claim 1 wherein at least one guided unit further includes a magnetic field sensor or compass for determining rotational orientation of the guided unit.

16. The underwater navigation system of claim 1 wherein at least one guided unit further includes a temperature sensor for measuring the temperature of the water in the immediate vicinity of the guided unit.

17. The underwater navigation system of claim 1 wherein at least one guided unit further includes a salinity sensor for measuring the salinity of the water in the immediate vicinity of the guided unit.

18. The underwater navigation system of claim 1 wherein at least one beacon unit further includes an positioning receiver for determining the location of the beacon unit from navigation signals received from a navigation system.

19. The underwater navigation system of claim 1 wherein at least one beacon unit further includes an energy harvesting unit.

20. The underwater navigation system of claim 1 wherein at least one beacon unit further includes an anchor for anchoring said beacon unit to floor of the water body, a buoyancy collar for causing the beacon unit to float, and a tether for securing the beacon unit to the anchor.

21. The underwater navigation system of claim 3 wherein the optical transceiver comprises non-linear optics and/or adaptive optics.

22. The underwater navigation system of claim 1 wherein at least one location reference unit comprises an atomic clock or a clock based on atom interferometry.

23. The underwater navigation system of claim 1 wherein at least one beacon unit comprises an atomic clock or a clock based on atom interferometry.

24. The underwater navigation system of claim 1 wherein at least one guided unit comprises an atomic clock or a clock based on atom interferometry.

* * * * *